United States Patent [19]

Speakman

[11] 4,097,409

[45] Jun. 27, 1978

[54] PREPARATION OF TITANIUM CONTAINING CATALYST ON MAGNESIUM SUPPORT MATERIAL

[75] Inventor: John Gabriel Speakman, Bo'ness, Scotland

[73] Assignee: The British Petroleum Company Limited, London, England

[21] Appl. No.: 746,494

[22] Filed: Dec. 1, 1976

[30] Foreign Application Priority Data

Dec. 4, 1975 United Kingdom ............... 49813/75

[51] Int. Cl.² ........................... C08F 4/02; C08F 4/10
[52] U.S. Cl. ........................... 252/429 R; 252/429 C; 252/428; 252/430; 252/441; 526/129; 526/130
[58] Field of Search ........... 252/428, 430, 441, 429 C, 252/429 R

[56] References Cited

U.S. PATENT DOCUMENTS

| 3,205,216 | 9/1965 | McManimie et al. ....... 252/429 A X |
| 3,993,588 | 11/1976 | Thukral ........................... 252/441 X |

FOREIGN PATENT DOCUMENTS

| 1,264,040 | 2/1972 | United Kingdom. |
| 1,265,070 | 3/1972 | United Kingdom. |
| 1,352,718 | 5/1974 | United Kingdom. |
| 1,367,775 | 9/1974 | United Kingdom. |

*Primary Examiner*—Patrick P. Garvin
*Attorney, Agent, or Firm*—Brooks, Haidt, Haffner & Delahunty

[57] ABSTRACT

Process for the production of a supported Ziegler catalyst comprising treating a support material, obtained by heating silica with a magnesium halide or alkoxide, with a halogen containing titanium compound at a temperature below 40° C.

9 Claims, No Drawings

PREPARATION OF TITANIUM CONTAINING CATALYST ON MAGNESIUM SUPPORT MATERIAL

The present invention relates to a process for the production of a supported Ziegler catalyst and to the use of the catalyst in the polymerisation of olefins.

It has long been known that olefins such as ethylene can be polymerised by contacting them under polymerisation conditions with a catalyst comprising a transition metal compound, e.g. titanium tetrachloride and a co-catalyst or activator, e.g. an organometallic compound such as triethyl aluminium. Catalysts of this type are generally referred to as Ziegler catalysts and will be referred to as such throughout this specification. It is also known that Ziegler catalysts can be deposited on support materials such as silicon carbide, calcium phosphate, sodium carbonate, magnesium carbonate, magnesium oxide, magnesium hydroxychloride and magnesium chloride, to give so-called "supported Ziegler catalysts" and that these catalysts can be used together with a co-catalyst (e.g. triethyl aluminium) to polymerise olefins.

The present invention provides a process for the production of a supported Ziegler catalyst comprising treating a magnesium-containing support material with a halogen-containing titanium compound at a temperature below 40° C, wherein the magnesium-containing support material is the product obtained by heating at a temperature in the range 150°-1000° C a magnesium halide or a magnesium alkoxide with silica or a silica composite containing at least 50% wt. of silica, and having surface hydroxyl groups.

The invention further provides a process for polymerising 1-olefins comprising contacting a monomeric 1-olefin under polymerisation conditions with (A) the supported Ziegler catalyst of the present invention and (B) a Ziegler catalyst activator.

The magnesium-containing support material is preferably the product obtained by heating a magnesium halide, preferably magnesium chloride with silica at a temperature in the range 150° to 1000° C, preferably 300°-800° C. The silica or silica composite preferably has a mean particle diameter in the range 30 to 300 microns and a surface area (B.E.T.) of 50 to 1000 square meters per gram; the quantity of magnesium halide or alkoxide used is suitably sufficient to give a magnesium concentration in the range 0.5 to 20% preferably 3 to 10% based on the weight of the silica and magnesium compound together. For further details of magnesium-containing support materials of this type reference may be made to U.S. patent application Ser. No. 529,391 filed Dec. 4, 1974 now U.S. Pat. No. 3,993,588. The magnesium-containing support material must be substantially free from water before treating with the halogen-containing titanium compound.

The halogen-containing titanium compound is a tetravalent titanium compound containing at least one halogen atom chemically bonded to titanium. Preferred compounds have the general formula $Ti(OR)_n X_{4-n}$ wherein $n$ is 0, 1, 2 or 3, X is a halogen atom, preferably chlorine and R is an organic group. R is preferably an alkyl group containing 1 to 6 carbon atoms. Examples of preferred compounds are titanium tetra-chloride and titanium dichloro di-isopropylate.

The quantity of titanium compound employed is suitably sufficient to give a titanium concentration in the catalyst in the range 0.01 to 20 wt %, preferably 1 to 10 wt % based on the total weight of the catalyst. The quantity employed, for a given titanium compound and support material is preferably not greater than the quantity that is absorbed by the support. The quantity that is absorbed by a given support is dependent to some extent on the treatment technique employed, but a rough measure of the amount of titanium that is absorbed by a given support can generally be determined as follows:

The magnesium-containing support material is slurried with 5 times its weight of a 7.5% w/w solution of the titanium compound in an inert solvent, stirred at room temperature for 15 minutes at a speed sufficient to maintain the support in suspension. The slurry is then filtered and washed with two aliquots of the inert solvent, each aliquot being about 5 times the weight of the original sample of support. The quantity of titanium in the filtrate plus washings is determined by a standard analytical technique and hence the weight of absorbed titanium can be calculated by difference. If the support material is found to be so porous that a slurry is not formed in the above technique, further inert solvent is added until a slurry is formed. For most titanium compounds according to the invention, cyclohexane is found to be a suitable inert solvent.

The treating of the magnesium-containing support material with the titanium compound is carried out at a temperature below 40° C, preferably below 30° C and preferably above −25° C. The treating can be carried out, for example, by mixing titanium tetrachloride (which is liquid at room temperature) with the support material; or by mixing a solution of a halogen-containing titanium compound in a suitable volatile inert solvent with the support material and allowing the solvent to evaporate or evaporating the solvent under reduced pressure; or by passing the vapour of a halogen-containing compound into the support material. Suitable volatile inert solvents are for example hydrocarbons such as cyclohexane, petroleum ether, isobutane, or benzene, or ethers such as tetrahydrofuran or diethyl ether. When it is desired to use a vapour impregnation technique, the vapour of the titanium compound can be passed into the support material using a carrier gas (e.g. nitrogen) or a vacuum deposition technique. If the treating results in an exothermic reaction between the titanium compound and the support material then steps should be taken to ensure that the temperature of the mixture is maintained below 40° C. In a particularly preferred method of impregnation the magnesium-containing support material is slurried with a mixture of titanium tetrachloride, a volatile inert solvent and a lower alcohol, e.g. isopropanol. The quantity of titanium tetrachloride is preferably sufficient to give 1 to 10% by weight of titanium based on total catalyst weight and the quantity of alcohol is suitably 0.1 to 3.9 moles, preferably 1.0 to 3.0 moles per mole of $TiCl_4$. The quantity of inert solvent is suitably 2–20g per g of support.

If, after the treating, it is found that the produced supported Ziegler catalyst contains free halogen-containing titanium compound, i.e compound that is not absorbed by the support material then the free material is preferably removed from the catalyst, for example, by solvent washing using a hydrocarbon or other inert solvent in which the titanium compound is soluble or, if the titanium compound is appreciably volatile, by gas purging the catalyst at atmospheric or reduced pressure.

The polymerisation process according to the present invention can be applied to the polymerisation of 1-olefins e.g. ethylene or propylene, or mixtures of olefins, e.g. ethylene with other 1-olefins, for example, propylene, 1-butene, 1-pentene, 1-hexene, 4-methyl pentene-1, or dienes e.g. 1,3-butadiene or isoprene. The process is particularly suitable for the polymerisation of ethylene or copolymerisation of ethylene with up to 40 weight % (based on total monomer) of comonomers, i.e. one or more other 1-olefins.

As with conventional supported Ziegler catalysts, the catalyst of the present invention is activated with a Ziegler catalyst activator. Ziegler catalyst activators and the method by which they are used to activate Ziegler catalysts are well known. Examples of Ziegler catalyst activators are organic derivatives or hydrides of metals of Groups I, II, III and IV of the Periodic Table. Particularly preferred are the trialkyl aluminiums e.g. triethyl or tri-isobutyl aluminium or an alkyl aluminium halide.

The polymerisation conditions can be in accordance with known techniques used in supported Ziegler polymerisation. The polymerisation can be carried out in the gaseous phase or in the presence of a dispersion medium in which the monomer is soluble. As a liquid dispersion medium use can be made of an inert hydrocarbon which is liquid under the polymerisation conditions, or of the monomer or monomers themselves maintained in the liquid state under their saturation pressure. The polymerisation can, if desired, be carried out in the presence of hydrogen gas or other chain transfer agent to vary the molecular weight of the produced polymer.

The polymerisation is preferably carried out under conditions such that the polymer is formed as solid particles suspended in a liquid diluent. Generally the diluent is selected from paraffins and cycloparaffins having from 3-30 carbon atoms per molecule. Suitable diluents include, for example, isopentane, isobutane and cyclohexane. Isobutane is preferred.

The polymerisation can be carried out under continuous or batch conditions.

Methods of recovering the product polyolefin are well known in the art.

The polymerisation catalyst of the present invention can be used to make high density ethylene polymers and copolymers at high productivity having properties which render then suitable for injection moulding. The polymer obtained also has an improved particle size distribution with typically very low fines content.

The invention is further illustrated by the following Examples:

In the Examples the melt index ($MI_{2.16}$) was determined according to ASTM method 1238 using a 2.16 Kg load; the units are grammes per 10 minutes.

EXAMPLE 1

Support Preparation 31.7 g Davison Grade 951 silica was charged to a furnace and fluidised with a 1.0 liters/min flow of dry nitrogen whilst being dried for 3 hours at 200° C. The silica was allowed to cool then 12.0 g $MgCl_2$ (B.D.H. Technical Anhydrous grade) was added. The mixture was fluidised with a 1.0 liters/min flow of dry nitrogen and heated at 500° C for 7 hours. 34.7 g of catalyst support were recovered and stored in a dry atmosphere.

Catalyst Preparation 13.2 g of the support were slurried at a temperature below 40° C. with 65 ml dry, deoxygenated cyclohexane and 2.1 ml $TiCl_4$ and 2.9 ml $Pr^iOH$ were added (this was sufficient to give ca. 7% Ti as $Ti(OPr^i)_2Cl_2$ on the catalyst). The mixture was placed in a glass tube 165 mm in height by 45 mm in diameter with a '0' mesh glass sinter at the base, through which dry nitrogen was passed at ca. 1 liters/min. The catalyst was stirred in this apparatus for 5 hours until it was dry. The catalyst was stored in a dry nitrogen atmosphere.

Polymerisation

Polymerisations were carried out in ½ gallon (A) and in 1 gallon (B) stainless steel stirred autoclaves. The catalyst was charged to the reactor which was purged with nitrogen and maintained at 30°–40° C. Aluminium triethyl was added followed by 750 ml (A) or 1000 ml (B) of isobutane. The reactor was heated until the pressure of isobutane reached 100 psig (58° C). Hydrogen was added (if employed, see Table). Further heating brought the reactor to the polymerisation temperature (95° C) and ethylene was admitted to bring the total pressure of the reactor contents to 600 psig. Ethylene was added continuously to maintain this pressure during the polymerisation. The results are given in the table.

Comparative Test

A similar procedure was followed as in Example 1 except that the slurry of magnesium containing support, $Ti(OPr^i)_2Cl_2$ and cyclohexane was heated at 80° C under reflux for 2 hours in a dry nitrogen atmosphere, and then the cyclohexane was distilled off. Polymerisation was carried out as in Example 1 except that the temperature was 80° C.

As can be seen from the Table, this catalyst is much less sensitive to the hydrogen chain transfer agent and even with a high partial pressure of 120 psi gives polymer of low melt index. When sufficient hydrogen was added to give injection moulding type polymer (MI — 5-10), the productivity fell to a low value (<500 g/g/hour), so low that catalyst residues would have to be removed from the polymer before it was commercially acceptable.

EXAMPLE 2

3.31 g of the catalyst support described in Example 1, 0.7ml isopropanol and 0.5ml of titanium tetrachloride were charged to a Fisher-Porter bottle in a nitrogen purged glove box. 80ml of liquid isobutane were admitted to the bottle and the mixture was well shaken. The isobutane was allowed to evaporate off slowly at room temperature and the contents of the flask were thoroughly purged with dry nitrogen to remove unabsorbed reagents and isobutane.

Polymerisation was carried out as for Example 1 and the results are given in the Table.

EXAMPLE 3

12.5g of the catalyst support described in Example 1, 100ml of petroleum ether 40–60, 2.0ml of titanium tetrachloride and 2.8ml of isopropanol were thoroughly mixed. The mixture was put into a rotary evaporator and the solvent mixed at ambient temperature in a nitrogen atmosphere over 3 hours.

Polymerisation was carried out as for Example 1 and the results are given in the Table.

TABLE

| Example No. | Reactor | Catalyst wt. (g) | Weight of Al alkyl (g) | Hydrogen Pressure (bar) | Productivity (hour$^{-1}$) | MI |
|---|---|---|---|---|---|---|
| 1 | A | 0.159 | 0.401 | 0 | 7990 | 0 |
| 1 | B | 0.147 | 0.401 | 6.9 | 1710 | 12.3 |
| 1 | A | 0.168 | 0.401 | 6.2 | 1550 | 5.32 |
| Comparative Test | A | 0.122 | 0.267 | 8.3 | 1033 | 0.28 |
| 2 | B | 0.162 | 0.401 | 5.5 | 1850 | 3.84 |
| 3 | B | 0.104 | 0.267 | 6.9 | 1410 | 11.6 |

I claim:

1. A process for the production of a supported Ziegler catalyst comprising treating: (a) a magnesium-containing support material obtained by heating at a temperature in the range of about 150°–1000° C a magnesium halide or a magnesium alkoxide with an inorganic oxide having surface hydroxyl groups, said inorganic oxide being silica or a silica composite containing at least 50% by weight of silica with (b) a halogen containing titanium compound of the formula Ti $(OR)_nX_{4-n}$ wherein $n$ is 0, 1, 2, or 3, X is halogen and R is an alkyl group containing 1-6 carbon atoms at a temperature below 40° C, said catalyst having a magnesium concentration of from about 0.5 to 20% by weight based on the weight of the silica and magnesium compound together and a titanium concentration in the range of from about 0.01 to 20 wt. % based on the total weight of the catalyst.

2. A process as claimed in claim 1 wherein the magnesium containing support material is the product of heating silica with magnesium chloride.

3. A process as claimed in claim 1 wherein the heating is carried out at 300°–800° C.

4. A process as claimed in claim 1 wherein the quantity of magnesium halide or alkoxide used is in the range 3 to 10% based on the weight of the silica and magnesium compound together.

5. A process as claimed in claim 1 wherein the titanium compound is titanium tetrachloride.

6. A process as claimed in claim 1 wherein the quantity of halogen-containing titanium compound is sufficient to give a titanium concentration in the range 1 to 10 wt % based on the total catalyst weight.

7. A process as claimed in claim 1 wherein the treating of the magnesium-containing support material is carried out at a temperature in the range −25° to +30° C.

8. A process as claimed in claim 1 wherein the treating is carried out by mixing the magnesium-containing support material with a solution of the titanium compound in a volatile inert solvent.

9. A process as claimed in claim 1 wherein the treating is carried out by mixing the magnesium-containing support material with titanium tetrachloride, a volatile inert solvent and a lower alcohol.

* * * * *